(12) United States Patent
Shiwa

(10) Patent No.: US 10,267,215 B2
(45) Date of Patent: Apr. 23, 2019

(54) CONTROL APPARATUS

(71) Applicant: SUBARU CORPORATION, Tokyo (JP)

(72) Inventor: Daiki Shiwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 166 days.

(21) Appl. No.: 15/412,262

(22) Filed: Jan. 23, 2017

(65) Prior Publication Data

US 2017/0276063 A1  Sep. 28, 2017

(30) Foreign Application Priority Data

Mar. 24, 2016 (JP) ................................. 2016-060002

(51) Int. Cl.

| F02B 37/18 | (2006.01) |
| F04D 27/00 | (2006.01) |
| F01D 21/00 | (2006.01) |
| F02B 37/16 | (2006.01) |

(Continued)

(52) U.S. Cl.
CPC .......... *F02B 37/183* (2013.01); *F01D 21/003* (2013.01); *F02B 37/16* (2013.01); *F02D 9/02* (2013.01); *F02D 9/04* (2013.01); *F04D 27/001* (2013.01); *F02D 2200/0406* (2013.01)

(58) Field of Classification Search
None
See application file for complete search history.

(56) References Cited

U.S. PATENT DOCUMENTS

2006/0248889 A1\* 11/2006 Sagisaka ................. F02B 37/18
                                                                                  60/602
2016/0131065 A1\* 5/2016 Ossareh .................. F02D 41/22
                                                                                  701/103

FOREIGN PATENT DOCUMENTS

JP          2008-025426 A       2/2008
JP          2014101813 A  *    6/2014  .............. F02B 39/16
                                   (Continued)

OTHER PUBLICATIONS

JP 2014101813 English Language Machine Translation.\*
(Continued)

*Primary Examiner* — Mark A Laurenzi
*Assistant Examiner* — Wesley G Harris
(74) *Attorney, Agent, or Firm* — McDermott Will & Emery LLP

(57) ABSTRACT

A control apparatus includes a waste gate valve that opens and closes a passage bypassing a turbine in an exhaust passage of an engine, an air bypass valve that opens and closes a passage bypassing a compressor in an intake passage of the engine, a pressure measuring unit that measures a pressure at a downstream side of the compressor, an air-amount measuring unit that measures an amount of air flowing into the intake passage, an air-bypass-valve controller that opens the air bypass valve when a throttle valve in the intake passage is closed, a closed-state-malfunction diagnosing unit that diagnoses a closed-state malfunction of the air bypass valve based on a fluctuation in the measured amount of air when the throttle valve is closed, and a waste-gate-valve controller that closes the waste gate valve if the measured pressure is lower than a predetermined pressure when the throttle valve is closed.

4 Claims, 4 Drawing Sheets

(51) Int. Cl.
 *F02D 9/02* (2006.01)
 *F02D 9/04* (2006.01)

(56) References Cited

FOREIGN PATENT DOCUMENTS

JP 2014101813 A * 6/2014
JP 2016-109023 A 6/2016

OTHER PUBLICATIONS

Office Action issued in corresponding Japanese Patent Application No. 2016-060002, dated Jul. 4, 2017 with English Translation.

* cited by examiner

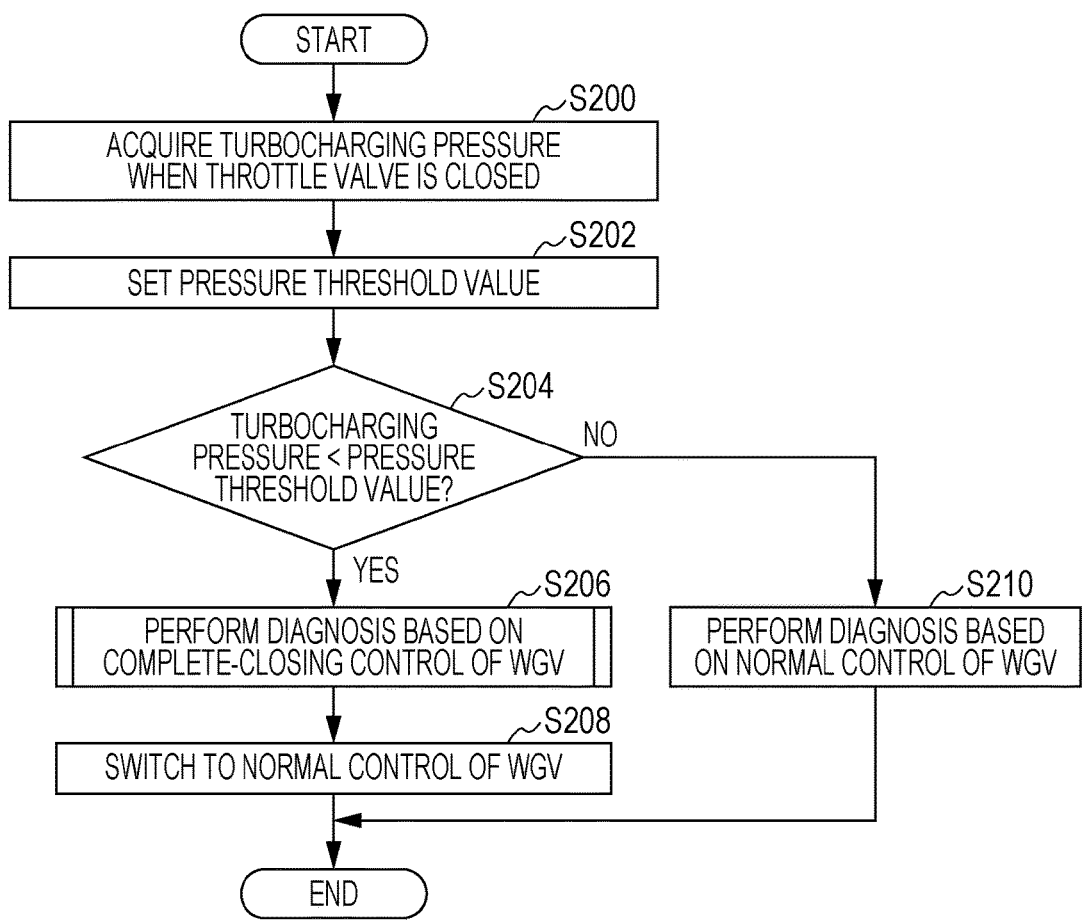

CONTROL APPARATUS

CROSS-REFERENCE TO RELATED APPLICATIONS

The present application claims priority from Japanese Patent Application No. 2016-060002 filed on Mar. 24, 2016, the entire contents of which are hereby incorporated by reference.

BACKGROUND

1. Technical Field

The present invention relates to engine control apparatuses that are capable of diagnosing closed-state malfunctions of compressor air recirculation valves.

2. Related Art

In an engine equipped with a turbocharger in the related art, it is known that a passage is provided for causing intake air to recirculate from the downstream side toward the upstream side of a compressor provided in an intake passage. This passage is intervened by a valve (i.e., compressor air recirculation valve), and the passage is opened and closed by this valve.

A known method of diagnosing a closed-state malfunction of this compressor air recirculation valve involves checking whether or not intake pulsation is occurring in the intake passage when a throttle valve is closed during turbocharging (for instance, see Japanese Unexamined Patent Application Publication No. 2008-25426).

The amplitude of the aforementioned intake pulsation occurring when a closed-state malfunction has occurred in the compressor air recirculation valve changes in accordance with the turbocharging pressure when the throttle valve is closed. Specifically, in a range with a relatively low turbocharging pressure, since the turbocharging pressure at the upstream side of the throttle valve decreases quickly even if a closed-state malfunction has occurred in the compressor air recirculation valve, the intake pulsation is smaller than that in a range with a high turbocharging pressure. Therefore, in the range with the relatively low turbocharging pressure (i.e., low turbocharging range), there is a problem in terms of reduced accuracy for diagnosing a closed-state malfunction of the compressor air recirculation valve.

SUMMARY OF THE INVENTION

It is desirable to provide an engine control apparatus that can accurately diagnose a closed-state malfunction of a recirculation valve even in a range with a relatively low turbocharging pressure.

A first aspect of the present invention provides an engine control apparatus including a waste gate valve that opens and closes a passage that bypasses a turbine provided in an exhaust passage of an engine, a recirculation valve that opens and closes a recirculation passage connecting an inlet and an outlet for a compressor provided in an intake passage of the engine, a pressure sensor that measures a pressure at a downstream side of the compressor in the intake passage, an airflow sensor that measures an amount of air flowing into the intake passage, and a processor programmed to open the recirculation valve when a throttle valve disposed in the intake passage is closed, diagnose a closed-state malfunction of the recirculation valve based on a fluctuation in the amount of air measured by the airflow sensor when the throttle valve is closed, and close the waste gate valve if the pressure measured by the pressure sensor is lower than a predetermined pressure when the throttle valve is closed.

A second aspect of the present invention provides an engine control apparatus including a waste gate valve that opens and closes a passage that bypasses a turbine provided in an exhaust passage of an engine, a recirculation valve that opens and closes a recirculation passage connecting an inlet and an outlet for a compressor provided in an intake passage of the engine, a pressure sensor that measures a pressure at a downstream side of the compressor in the intake passage, and a processor programmed to open the recirculation valve when a throttle valve disposed in the intake passage is closed, diagnose a closed-state malfunction of the recirculation valve based on a fluctuation in the pressure measured by the pressure sensor when the throttle valve is closed, and close the waste gate valve if the pressure measured by the pressure sensor is lower than a predetermined pressure when the throttle valve is closed.

The predetermined pressure may be set to a value that increases with increasing rotation speed of the engine.

BRIEF DESCRIPTION OF THE DRAWINGS

FIG. 4 is a flowchart illustrating the flow of an overall closed-state-malfunction diagnosing process.

DETAILED DESCRIPTION

Figure 1:
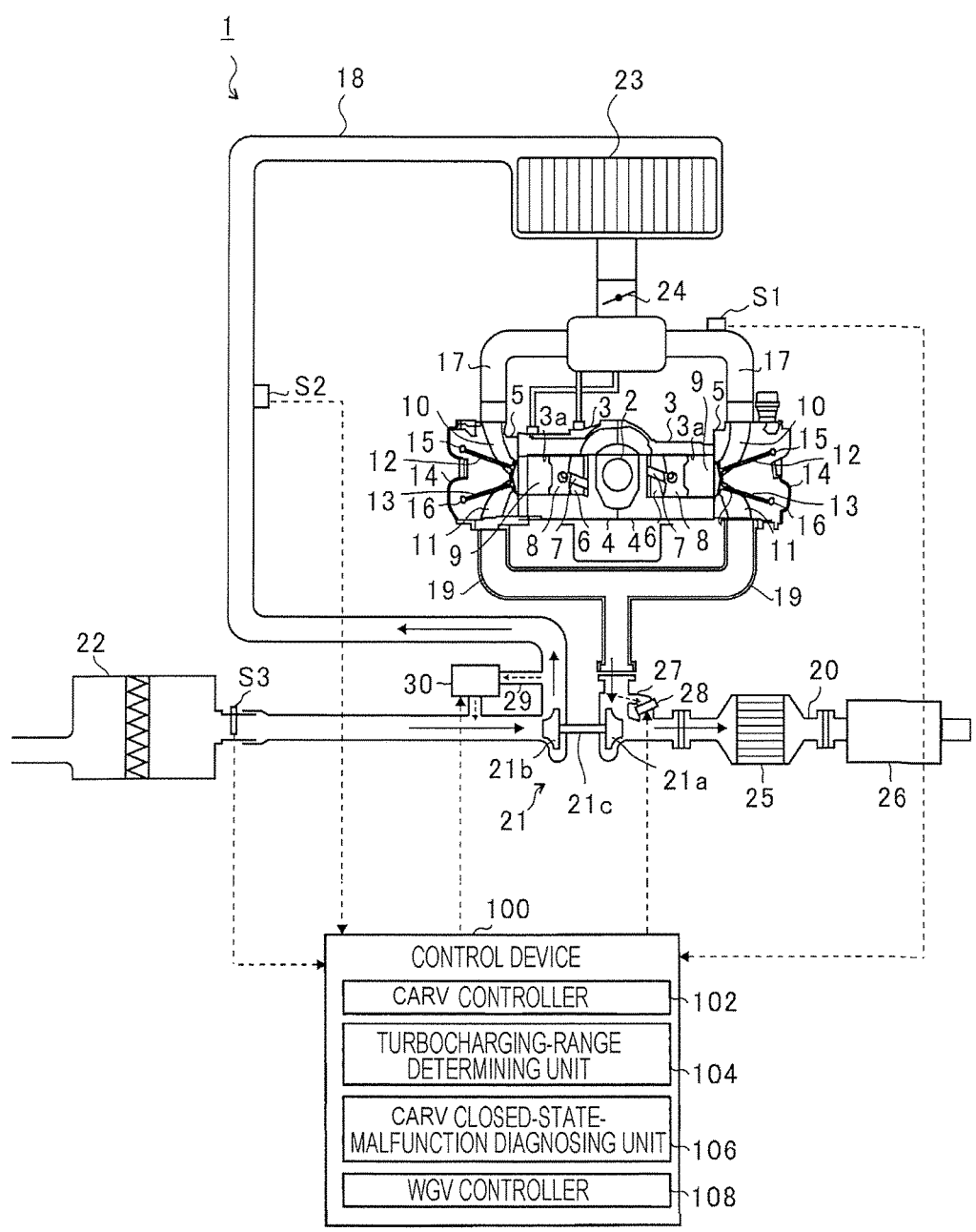
FIG. 1 schematically illustrates the configuration of an engine.

A preferred implementation of the present invention will be described below with reference to the appended drawings. For instance, the dimensions, materials, and other specific numerical values indicated in this implementation are merely examples for providing an easier understanding of the implementation of the invention and are not intended to limit the implementation of the present invention, unless otherwise specified. In this description and the drawings, components having substantially identical functions and configurations are given the same reference signs, and redundant descriptions thereof are omitted. Furthermore, components that are not directly related to the implementation of the present invention are not illustrated in the drawings.

FIG. 1 schematically illustrates the configuration of an engine 1. As illustrated in FIG. 1, the engine 1 is a horizontally-opposed four-cylinder engine in which cylinder bores 3a formed in two cylinder blocks 3 are disposed facing each other with a crankshaft 2 interposed therebetween.

Each cylinder block 3 is integrated with a crank casing 4 and has a cylinder head 5 fixed to the opposite side from the crank casing 4. The crankshaft 2 is rotatably supported within a crank chamber 6 formed by the crank casing 4.

In each cylinder bore 3a, a piston 8 coupled to the crankshaft 2 via a connecting rod 7 is accommodated in a slidable manner. In the engine 1, spaces surrounded by the cylinder bores 3a, cylinder heads 5, and the heads of the pistons 8 serve as combustion chambers 9.

Each cylinder head 5 has an intake port 10 and an exhaust port 11 that communicate with the corresponding combustion chamber 9. One end of an intake valve 12 is located between the intake port 10 and the combustion chamber 9, and one end of an exhaust valve 13 is located between the exhaust port 11 and the combustion chamber 9.

Furthermore, the engine 1 is provided with intake-valve cams 15 and exhaust-valve cams 16 within cam chambers surrounded by the cylinder heads 5 and head covers 14. Each intake-valve cam 15 is in contact with the other end of the corresponding intake valve 12 and rotates so as to cause the intake valve 12 to move in the axial direction. Consequently, the intake valve 12 opens and closes the area between the intake port 10 and the combustion chamber 9. Each exhaust-valve cam 16 is in contact with the other end of the corresponding exhaust valve 13 and rotates so as to cause the exhaust valve 13 to move in the axial direction. Consequently, the exhaust valve 13 opens and closes the area between the exhaust port 11 and the combustion chamber 9.

The upstream sides of the intake ports 10 communicate with an intake passage 18 that includes an intake manifold 17. The downstream sides of the exhaust ports 11 communicate with an exhaust passage 20 that includes an exhaust manifold 19. Exhaust gas emitted from the combustion chambers 9 in the respective cylinders is collected at the exhaust manifold 19 via the exhaust ports 11 and is guided to a turbocharger 21.

The turbocharger 21 includes a turbine 21a rotated by the exhaust gas emitted from the exhaust manifold 19 and a compressor 21b rotated by the rotational power of the turbine 21a. The turbine 21a and the compressor 21b are coupled to each other by a turbine shaft 21c and rotate together.

The intake passage 18 is provided with an air cleaner 22, the compressor 21b, an intercooler 23, and a throttle valve 24 in that order from the upstream side. The compressor 21b compresses intake air, from which impurities, such as dust and dirt, have been removed at the air cleaner 22, and supplies the intake air to the intake passage 18. The throttle valve 24 has its degree of opening adjusted by an actuator (not illustrated) so as to adjust the flow rate of intake air in the intake passage 18.

The intercooler 23 cools the intake air that has been compressed and increased in temperature at the compressor 21b. The cooled intake air is then guided to the combustion chambers 9 via the intake manifold 17 and the intake ports 10. Then, an air-fuel mixture containing fuel injected from an injector (not illustrated) and the air guided to the combustion chambers 9 is ignited at a predetermined timing by ignition plugs (not illustrated) provided in the cylinder heads 5, so that the air-fuel mixture is combusted. The combustion causes the pistons 8 to reciprocate within the cylinder bores 3a, and the reciprocating motion is converted into rotating motion of the crankshaft 2 via the connecting rods 7. Exhaust gas generated as a result of the combustion is guided to the turbine 21a via the exhaust ports 11 and the exhaust manifold 19 and causes the turbine 21a to rotate. Then, the exhaust gas is cleaned with a catalyst 25 provided in the exhaust passage 20 and is emitted outside the vehicle through a muffler 26.

The exhaust passage 20 is provided with an exhaust bypass passage 27 that bypasses the turbine 21a so as to allow the upstream side and the downstream side of the turbine 21a to communicate with each other. The exhaust bypass passage 27 is intervened by a waste gate valve 28. The waste gate valve 28 opens and closes the exhaust bypass passage 27.

The intake passage 18 is provided with a recirculation passage 29 connecting an inlet and an outlet for the compressor 21b so as to allow the downstream side and the upstream side of the compressor 21b to communicate with each other. The air bypass passage 29 is intervened by a compressor air recirculation valve 30. The compressor air recirculation valve 30 is normally closed but is opened when the driver releases the gas pedal to close the throttle valve 24. The timing at which the compressor air recirculation valve 30 is opened may be determined based on either one of the releasing of the gas pedal and the closing of the throttle valve 24.

Furthermore, the engine 1 is provided with pressure sensors S1 and S2 and an airflow sensor S3. The pressure sensor S1 is attached to the intake manifold 17 and measures the pressure in the intake manifold 17. The pressure sensor S2 is disposed upstream of the throttle valve 24 in the intake passage 18 and measures the pressure at the upstream side of the throttle valve 24. The airflow sensor S3 is disposed near the outlet of the air cleaner 22 and measures the amount of air flowing into the intake passage 18. The measurement values of the pressure sensors S1 and S2 and the airflow sensor S3 are output to a control apparatus 100 of the engine 1.

The control apparatus 100 is constituted of a semiconductor integrated circuit including a central processing unit (CPU), a read-only memory (ROM) storing, for instance, a program, and a random access memory (RAM) serving as a work area. In addition to controlling the operation of the entire vehicle, including the engine 1, the control apparatus 100 performs a closed-state-malfunction diagnosing process for diagnosing the occurrence of a closed-state malfunction in which the compressor air recirculation valve 30 is fixed in a closed state. The closed-state-malfunction diagnosing process for the compressor air recirculation valve 30 is executed every time the throttle valve 24 is closed.

In the closed-state-malfunction diagnosing process for the compressor air recirculation valve 30, the following characteristics are utilized. In a case where a closed-state malfunction has occurred in the compressor air recirculation valve 30, the passage extending from the compressor 21b to the throttle valve 24 is closed when the throttle valve 24 is closed. The compressor 21b operates within this closed passage so that intake pulsation occurs.

Intake pulsation occurs with a relatively large amplitude if the pressure in the intake passage 18 is in a relatively high range (i.e., a high turbocharging range). Therefore, it can be readily diagnosed that a closed-state malfunction has occurred in the compressor air recirculation valve 30. However, if the pressure in the intake passage 18 is in a relatively low range (i.e., a low turbocharging range), the amplitude of the intake pulsation is small since the pressure at the upstream side of the throttle valve 24 decreases quickly. Therefore, in the low turbocharging range, it is difficult to diagnose whether a closed-state malfunction has occurred in the compressor air recirculation valve 30, as compared with the case of the high turbocharging range.

In this implementation, if the turbocharging range when closing the throttle valve 24 is the low turbocharging range, the waste gate valve 28 provided in the exhaust bypass passage 27 of the exhaust passage 20 is closed (i.e., completely closed) so as to suppress a decrease in the rotation speed of the turbine 21a. Thus, a decrease in the rotation speed of the compressor 21b that rotates together with the turbine 21a is also suppressed. As a result, the turbocharging pressure at the upstream side of the throttle valve 24 in the intake passage 18 is also maintained. Accordingly, intake pulsation with a large amplitude can be readily generated at the upstream side of the throttle valve 24 even in the low turbocharging range. The degree of opening of the waste gate valve 28 is not limited to the completely closed state and may be appropriately adjusted in accordance with, for instance, the turbocharging pressure such that the intake pulsation does not cause an excessive load and noise to occur in the intake system.

When executing the closed-state-malfunction diagnosing process for the compressor air recirculation valve 30, the control apparatus 100 functions as a compressor-air-recirculation-valve controller 102 (referred to as "CARV controller" hereinafter), a turbocharging-range determining unit 104, a compressor-air-recirculation-valve closed-state-malfunction diagnosing unit 106 (referred to as "CARV closed-state-malfunction diagnosing unit" hereinafter), and a waste-gate-valve controller 108 (referred to as "WGV controller" hereinafter).

The CARV controller 102 opens the compressor air recirculation valve 30 when the throttle valve 24 disposed in the intake passage 18 is closed. Based on the turbocharging pressure (i.e., pressure) at the downstream side of the compressor 21b when the throttle valve 24 is closed, the turbocharging-range determining unit 104 determines the turbocharging range when the throttle valve 24 is closed. Specifically, the turbocharging-range determining unit 104 acquires, from the pressure sensor S1, the turbocharging pressure in the intake manifold 17 when the throttle valve 24 is closed, and determines whether this turbocharging pressure is in either one of the high turbocharging range, in which the turbocharging pressure is higher than or equal to a predetermined pressure (referred to as "pressure threshold value" hereinafter), and the low turbocharging range, in which the turbocharging pressure is lower than the pressure threshold value. The pressure threshold value will be described later.

The CARV closed-state-malfunction diagnosing unit 106 diagnoses whether a closed-state malfunction has occurred in the compressor air recirculation valve 30 based on intake pulsation occurring at the upstream side of the throttle valve 24 in the intake passage 18 when the throttle valve 24 is closed. Specifically, the CARV closed-state-malfunction diagnosing unit 106 diagnoses that a closed-state malfunction has occurred in the compressor air recirculation valve 30 if the amplitude of the intake pulsation is larger than or equal to a predetermined amplitude (referred to as "amplitude threshold value" hereinafter), and diagnoses that a closed-state malfunction has not occurred in the compressor air recirculation valve 30 if the amplitude of the intake pulsation is smaller than the amplitude threshold value.

The amplitude threshold value is set to an amplitude value of intake pulsation based on which it can be determined that a closed-state malfunction has occurred in the compressor air recirculation valve 30 if intake pulsation with an amplitude higher than or equal to the value occurs in the low turbocharging range. This amplitude threshold value is calculated in advance from, for instance, a map associated with the amount of air and the engine rotation speed.

A specific intake-pulsation measuring method involves, for instance, using the pressure sensor S2 to measure fluctuations in the turbocharging pressure in the intake passage 18 when the waste gate valve 28 is closed and determining the fluctuations in the turbocharging pressure as intake pulsation. Alternatively, the airflow sensor S3 may be used to measure fluctuations in the amount of air in the intake passage 18 when the waste gate valve 28 is closed, and the fluctuations in the amount of air may be determined as intake pulsation.

In a case where the turbocharging-range determining unit 104 determines that the turbocharging range when closing the throttle valve 24 is the low turbocharging range, the WGV controller 108 performs control for closing the waste gate valve 28. By closing the waste gate valve 28, a decrease in the rotation speed of the turbine 21a is suppressed. This suppresses a decrease in the turbocharging pressure in the intake passage 18, so that intake pulsation can readily occur. In a case where the turbocharging-range determining unit 104 determines that the turbocharging range when closing the throttle valve 24 is the high turbocharging range, the WGV controller 108 does not control the waste gate valve 28 since intake pulsation with a large amplitude occurs regardless of the waste gate valve 28 not being completely closed when a closed-state malfunction occurs in the compressor air recirculation valve 30.

The pressure threshold value described above is set to a boundary value at which it is difficult to diagnose whether or not a closed-state malfunction has occurred if the turbocharging pressure at the upstream side of the throttle valve 24 is any lower when a closed-state malfunction has occurred in the compressor air recirculation valve 30. This pressure threshold value is normally set to a value that increases with increasing engine rotation speed, and is calculated in advance from, for instance, a map associated with the engine rotation speed.

Figure 2:
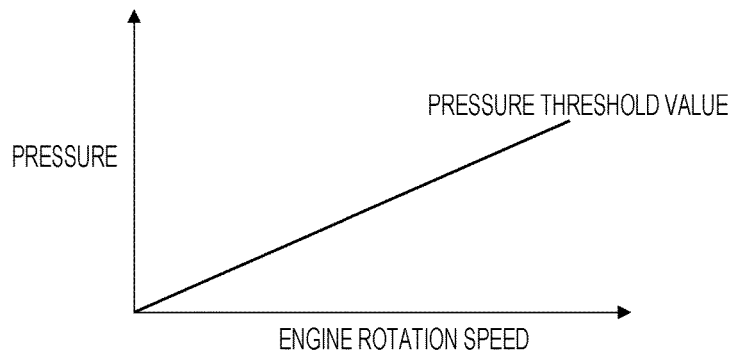
FIG. 2 illustrates the relationship between a pressure threshold value and an engine rotation speed.

FIG. 2 illustrates the relationship between the pressure threshold value and the engine rotation speed. In FIG. 2, the ordinate axis indicates the turbocharging pressure when the throttle valve 24 is closed, whereas the abscissa axis indicates the engine rotation speed.

As illustrated in FIG. 2, the pressure threshold value increases with increasing engine rotation speed. If the throttle valve 24 suddenly closes when the engine rotation speed is high, a pump loss increases rapidly, causing the vehicle to rapidly decelerate. In order to avoid such a phenomenon, control for gently closing the throttle valve 24 is performed when the engine rotation speed is high.

When the throttle valve 24 is gently closed, intake pulsation is less likely to occur at the upstream side of the throttle valve 24. In this implementation, the pressure threshold value increases with increasing engine rotation speed so that a closed-state malfunction of the compressor air recirculation valve 30 can be accurately diagnosed based on intake pulsation even when the engine rotation speed is high, thereby expanding the range in which the diagnosis is performed when the waste gate valve 28 is closed.

Figure 3A:
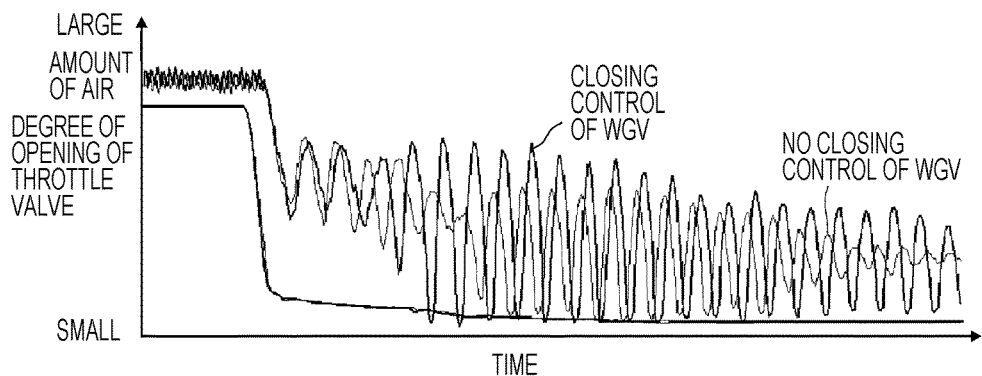
FIGS. 3A and 3B are graphs illustrating how intake pulsation occurs in a practical example and a comparative example.
Figure 3B:
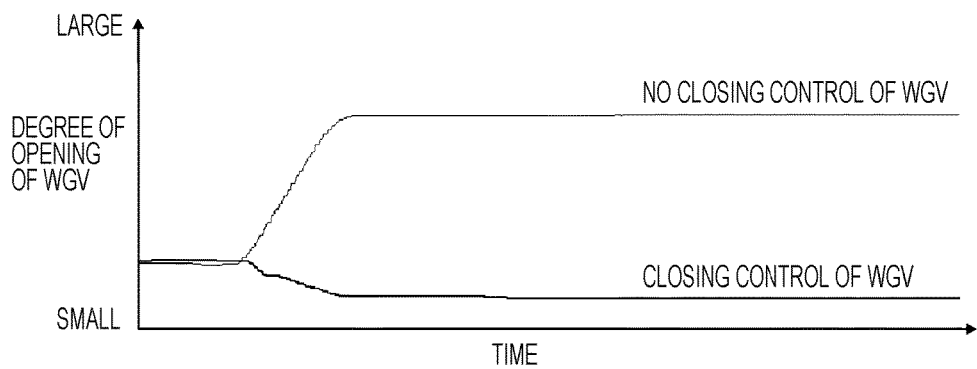

FIG. 3A is a graph illustrating how intake pulsation occurs when closing control is performed on the waste gate valve 28 (practical example) and when the closing control is not performed (comparative example) in the low turbocharging range. FIG. 3B is a graph illustrating the degree of opening of the waste gate valve 28. For instance, fluctuations in the amount of air measured by the airflow sensor S3 are used as the intake pulsation.

It is clear from FIGS. 3A and 3B that when the closing control is performed on the waste gate valve 28, intake pulsation occurs with a larger amplitude than when the closing control is not performed. If the waste gate valve 28 is closed (i.e., completely closed) when the throttle valve 24 is closed, there is no longer any exhaust gas flowing toward the exhaust bypass passage 27 and bypassing the turbine 21a, so that a decrease in the rotation speed of the turbine 21a is suppressed. Thus, a decrease in the rotation speed of the compressor 21b that rotates together with the turbine 21a is also suppressed. As a result, the turbocharging pressure at the upstream side of the throttle valve 24 in the intake passage 18 is also maintained. Accordingly, in a case where a closed-state malfunction has occurred in the compressor air recirculation valve 30, intake pulsation that is large enough for diagnosing the closed-state malfunction of the compressor air recirculation valve 30 can be generated even in the low turbocharging range, and the closed-state malfunction of the compressor air recirculation valve 30 can be accurately diagnosed.

Next, the flow of the overall closed-state-malfunction diagnosing process for the compressor air recirculation valve 30 will be described with reference to a flowchart in FIG. 4.

First, the turbocharging-range determining unit 104 acquires, from the pressure sensor S1, the pressure (i.e., turbocharging pressure) at the downstream side of the compressor 21b when the throttle valve 24 is closed (step S200). Furthermore, the turbocharging-range determining unit 104 refers to the map illustrated in FIG. 2 indicating the relationship between the engine rotation speed and the pressure threshold value so as to set the pressure threshold value based on the engine rotation speed (step S202).

Then, the turbocharging-range determining unit 104 determines whether or not the pressure (i.e., turbocharging pressure) acquired from the pressure sensor S1 is lower than the set pressure threshold value (step S204). If the turbocharging pressure is lower than the pressure threshold value (YES in step S204), the process proceeds to step S206 where closed-state-malfunction diagnosis for the compressor air recirculation valve 30 is performed based on complete-closing control of the waste gate valve 28.

The flow of the closed-state-malfunction diagnosis based on the complete-closing control of the waste gate valve 28 in step S206 will be described with reference to a flowchart in FIG. 5.

Figure 5:
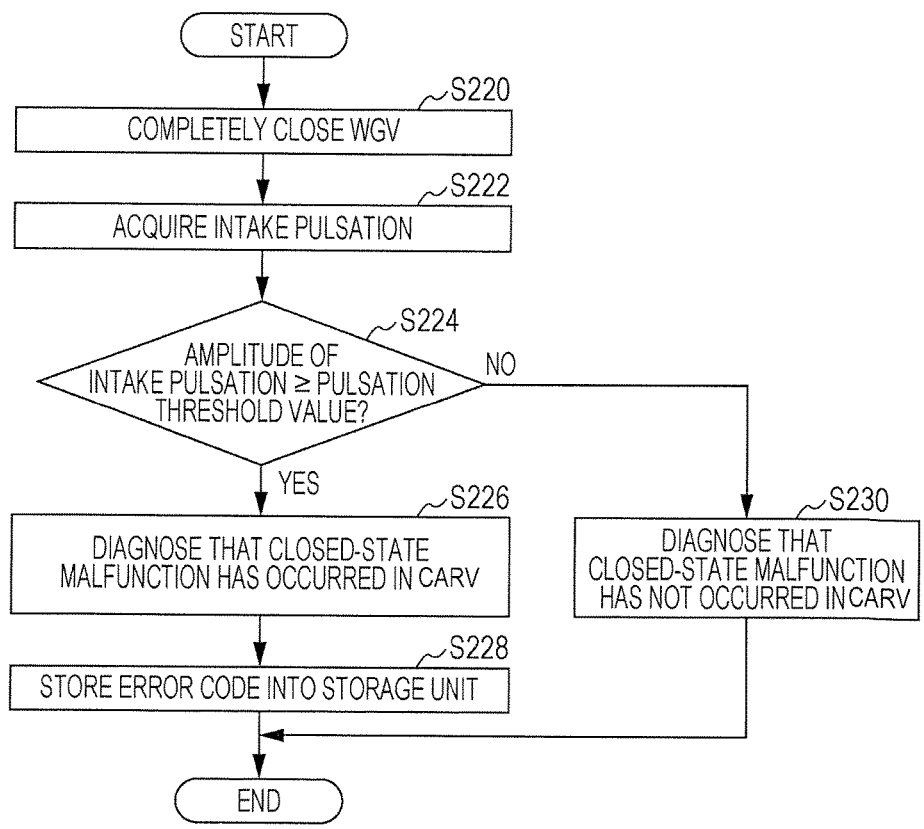
FIG. 5 is a flowchart illustrating the flow of a closed-state-malfunction diagnosing process based on complete-closing control of a waste gate valve.

As illustrated in FIG. 5, the WGV controller 108 first performs control for completely closing the waste gate valve 28 (step S220).

Then, the CARV closed-state-malfunction diagnosing unit 106 acquires intake pulsation occurring at the upstream side of the throttle valve 24 within a predetermined time period (e.g., one second) from when the waste gate valve 28 is completely closed (step S222). The intake pulsation may be, for instance, either one of fluctuations in the turbocharging pressure measured by the pressure sensor S2 and fluctuations in the amount of air measured by the airflow sensor S3.

Subsequently, the CARV closed-state-malfunction diagnosing unit 106 determines whether or not the amplitude of the intake pulsation acquired in step S222 is larger than or equal to a predetermined pulsation threshold value (step S224). If the amplitude of the intake pulsation is larger than or equal to the pulsation threshold value (YES in step S224), the CARV closed-state-malfunction diagnosing unit 106 diagnoses that a closed-state malfunction has occurred in the compressor air recirculation valve 30 (step S226), stores a predetermined error code into a storage unit of the control apparatus 100 (step S228), and ends the diagnosis based on the complete-closing control of the waste gate valve 28. The determination of whether or not the amplitude of the intake pulsation is larger than or equal to the pulsation threshold value may be performed based on whether or not the amplitude of the intake pulsation is larger than or equal to the pulsation threshold value continuously for a certain time period within the aforementioned predetermined time period or based on whether or not the intake pulsation with the amplitude larger than or equal to the pulsation threshold value has occurred for a predetermined number of times (one or more times) within the aforementioned predetermined time period.

In contrast, if the amplitude of the intake pulsation is smaller than the pulsation threshold value (NO in step S224), the CARV closed-state-malfunction diagnosing unit 106 diagnoses that a closed-state malfunction has not occurred in the compressor air recirculation valve 30 (step S230) and ends the diagnosis based on the complete-closing control of the waste gate valve 28.

Referring back to FIG. 4, the WGV controller 108 switches to normal control by cancelling the closing control of the waste gate valve 28 (step S208) and ends the diagnosing process.

If it is determined in step S204 that the turbocharging pressure when closing the throttle valve 24 is not lower than the pressure threshold value (NO in step S204), the diagnosis is performed under normal control without performing the control for completely closing the waste gate valve 28 (step S210). The diagnosis in this case may be performed by either one of the CARV closed-state-malfunction diagnosing unit 106 and another diagnosing unit based on a known diagnosis technique.

Although a preferred implementation of the present invention has been described above with reference to the appended drawings, it should be noted that the present invention is not limited to this implementation. It is obvious that a person skilled in the art could conceive of various types of modifications and alterations within the scope defined in the claims, and it is conceivable that such modifications and alterations naturally belong to the technical scope of the invention.

For instance, although the control apparatus 100 according to the implementation of the present invention is applied to a horizontally-opposed four-cylinder engine, the implementation of the present invention is not limited to this and may also be applied to either one of a V-type engine and an in-line engine. Furthermore, the position where the turbocharger 21 is installed is not limited to the position vertically below the engine 1 and may alternatively be a position vertically above the engine 1.

Furthermore, although the pressure sensor S1 and the pressure sensor S2 are separately provided in the above description, the pressure sensor S2 provided at the upstream side of the throttle valve 24 may function as both of these sensors. Moreover, the compressor air recirculation valve 30 and the waste gate valve 28 to which the closed-state-malfunction diagnosing process according to the implementation of the present invention is applied may be either one of on-off valves and a plurality of electrically-controlled valves that may have intermediate degrees of opening.

In the above description, a predetermined error code is stored into the storage unit of the control apparatus 100 in a case where it is diagnosed that a closed-state malfunction has occurred in the compressor air recirculation valve 30. Alternatively, a warning light for notifying that a closed-state malfunction has occurred may be displayed in a main panel of the driver seat so as to inform the driver of the occurrence of the closed-state malfunction.

As described above, according to the implementation of the present invention, a closed-state malfunction of the compressor air recirculation valve 30 can be accurately diagnosed even in a range with a relatively low turbocharging pressure.

The invention claimed is:

1. An engine comprising:
a waste gate valve that opens and closes a passage that bypasses a turbine provided in an exhaust passage of the engine;
a recirculation valve that opens and closes a recirculation passage connecting an inlet and an outlet for a compressor provided in an intake passage of the engine;
a pressure sensor that measures a pressure at a downstream side of the compressor in the intake passage;
an airflow sensor that measures an amount of air flowing into the intake passage; and
a processor programmed to:
open the recirculation valve when a throttle valve disposed in the intake passage is closed;
diagnose a closed-state malfunction of the recirculation valve based on a fluctuation in the amount of air measured by the airflow sensor when the throttle valve is closed; and
close the waste gate valve if the pressure measured by the pressure sensor is lower than a predetermined pressure when the throttle valve is closed.

2. The engine according to claim 1, wherein the predetermined pressure is set to a value that increases with increasing rotation speed of the engine.

3. An engine comprising:
a waste gate valve that opens and closes a passage that bypasses a turbine provided in an exhaust passage of the engine;
a recirculation valve that opens and closes a recirculation passage connecting an inlet and an outlet for a compressor provided in an intake passage of the engine;
a pressure sensor that measures a pressure at a downstream side of the compressor in the intake passage; and
a processor programmed to:
open the recirculation valve when a throttle valve disposed in the intake passage is closed;
diagnose a closed-state malfunction of the recirculation valve based on a fluctuation in the pressure measured by the pressure sensor when the throttle valve is closed; and
close the waste gate valve if the pressure measured by the pressure sensor is lower than a predetermined pressure when the throttle valve is closed.

4. The engine according to claim 3, wherein the predetermined pressure is set to a value that increases with increasing rotation speed of the engine.

* * * * *